US009178881B2

(12) United States Patent
Born

(10) Patent No.: US 9,178,881 B2
(45) Date of Patent: Nov. 3, 2015

(54) PROOF OF DEVICE GENUINENESS

(71) Applicant: Microsoft Corporation, Redmond, WA (US)

(72) Inventor: Bryan Born, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 14/050,100

(22) Filed: Oct. 9, 2013

(65) Prior Publication Data

US 2015/0100789 A1    Apr. 9, 2015

(51) Int. Cl.
*H04L 29/06* (2006.01)
*G06F 21/30* (2013.01)
*G06F 21/60* (2013.01)
*H04L 9/32* (2006.01)

(52) U.S. Cl.
CPC ............ *H04L 63/0876* (2013.01); *G06F 21/30* (2013.01); *G06F 21/60* (2013.01); *H04L 9/3236* (2013.01); *H04L 9/3271* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 8,955,076 B1 * | 2/2015 | Faibish et al. ................ | 726/7 |
| 2006/0015725 A1 * | 1/2006 | Voice et al. ................ | 713/168 |
| 2009/0217386 A1 * | 8/2009 | Schneider .................... | 726/30 |
| 2009/0300364 A1 | 12/2009 | Schneider | |
| 2012/0155639 A1 | 6/2012 | Oney et al. | |
| 2013/0097694 A1 | 4/2013 | Dang | |
| 2014/0304510 A1 * | 10/2014 | Sannegowda et al. ........ | 713/170 |

FOREIGN PATENT DOCUMENTS

| EP | 2124164 A2 | 11/2009 |
|---|---|---|
| WO | WO2009/025905 A2 | 2/2009 |

OTHER PUBLICATIONS

International Search Report & the Written Opinion of the International Searching Authority dated Jan. 5, 2015, International Application No. PCT/US2014/059210.
BlackBerry Device Service Solution, Security Technical Overview, Version 6.2, published Feb. 1, 2013, 126 pages.
Alain, "EdgeSight: Reporting On Non-PC Devices," Wag the Real, [http://wagthereal.com/2011/07/13/edgesight-reporting-on-non-pc-devices/] published Jul. 13, 2011, 4 pages.
Brickell, Ernie, et al., "Enhanced Privacy ID," Dr. Dobb's The World of Software Development, published Sep. 8, 2009, 4 pages.

(Continued)

*Primary Examiner* — Kaveh Abrishamkar
(74) *Attorney, Agent, or Firm* — Timothy Churna; Kate Drakos; Micky Minhas

(57) ABSTRACT

A cryptographic process is provided which allows a server to verify that a client device is genuine. The client device is provisioned with first and second data elements and a key which can be stored in fuses at the time of manufacture. When the client device requests digital content such as multimedia from the server, the server issues a genuineness challenge to the client device. The genuineness challenge is a message which includes a message authentication code (MAC) derived from a secret key of the server, in addition to an encrypted timestamp nonce. The client device prepares a response which includes a MAC derived from the client's key and the genuineness challenge. The response also includes the first and second data elements but not the client's key. The server processes the response to confirm that the client device is genuine.

19 Claims, 13 Drawing Sheets

(56) References Cited

OTHER PUBLICATIONS

Guidance on using the App Specific Hardware ID (ASHWID) to implement per-device app logic, Windows, [http://msdn.microsoft.com/en-us/library/windows/apps/jj553431.aspx], retrieved on May 22, 2013, 7 pages.
Hardware cryptographic device support for Web Services Security, IBM, [http://pic.dhe.ibm.com/infocenter/wasinfo/v6r1/index.jsp?topic=%2Fcom.ibm.websphere.base.doc%2Finfo%2Faes%2Fae%2Fcwbs_cryptodev.html], retrieved on May 22, 2013, 3 pages.
PCT Demand and Amendments under Article 34 dated Apr. 13, 2015, International Application No. PCT/US2014/059210.
Invitation to Submit Amendments dated Apr. 29, 2015, International Application No. PCT/US2014/059210.
Response to Invitation to Submit Amendments dated May 13, 2015, International Application No. PCT/2014/059210.

* cited by examiner

Fig. 19

| | |
|---|---|
| Kmaster1, 1910 | Payload_c, 1932 |
| Kmaster2, 1911 | Payload_MAC_c, 1933 |
| Kmaster3, 1912 | Genuineness_challenge_c, 1934 |
| Kmaster4, 1913 | Genuineness_response, 1935 |
| Random number output of RNG, 1914 | Dclient1, 1936 |
| Nonce_time, 1915 | Dclient2, 1937 |
| Nonce_time_exp, 1916 | Client_MAC, 1938 |
| Genuineness_nonce, 1917 | |
| Payload, 1918 | |
| Payload_MAC, 1919 | |
| Payload_MAC_comp, 1920 | |
| Genuineness_challenge, 1921 | |
| Dclient2_comp, 1922 | |
| Kclient, 1923 | |
| Client_MAC_comp, 1924 | |
| Validity flag for client data elements, 1925 | |
| Validity flag for client MAC, 1926 | |
| Validity flag for payload MAC, 1927 | |
| Flag for expiration, 1928 | |
| Flag for authorizing access to digital content, 1929 | |
| Digital content, 1930 | |
| Decryption key, 1931 | |

1900

US 9,178,881 B2

PROOF OF DEVICE GENUINENESS

BACKGROUND

Client devices such as laptops, personal computers, game consoles, tablets and smart phones are commonly used to allow a user to consume digital content. This content can include audio such as music and lectures, video such as movies, software such as video games and other applications, and other types of digital data. However, the owners of the digital content desire to control how the content is distributed, e.g., to gain revenue from the content and to ensure that the content is appropriate for a computing device to protect the user experience.

SUMMARY

Technology described herein provides various embodiments for proving that a computing device is genuine.

The computing device can be a client device in a network in which a server controls the delivery of digital content. The client device requests access to digital content, and the server responds by verifying the genuineness of the client device before allowing access to the content. In one approach, the client device and the server have respective secret keys. The keys of the server are not shared with the client device and the key of the client device is not shared with the server. Although, cryptographically-derived data elements of the client device are shared with the server, and the server can derive the key of the client device from the shared data elements.

In one approach, the server provides a genuineness challenge message to the client device. The client device provides a message authentication code (MAC) for the genuineness challenge message using its key and returns a message including the MAC and the first and second data elements. The server verifies that the second data element was derived from the first data element using a process known to the server and the server's own key. Further, the server derives the key of the client device from the data elements and the server's own key. Using the first and second data elements and the key, the server validates the MAC of the client. The server also validates a MAC of the server which was inserted into the genuineness challenge message and returned in the message. The server further validates a genuineness nonce of the server such as a timestamp which was inserted into the genuineness challenge message and returned in the message, to ensure that the genuineness challenge message has not expired. After verifying that the client device is genuine, the server authorizes access to the digital content. For example, the server can deliver, to the client device, the digital content or a decryption key for decrypting the digital content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the drawings, like-numbered elements correspond to one another.

FIG. 19 depicts an example data structure which stores data fields at a server computing device.

DETAILED DESCRIPTION

Figure 1:
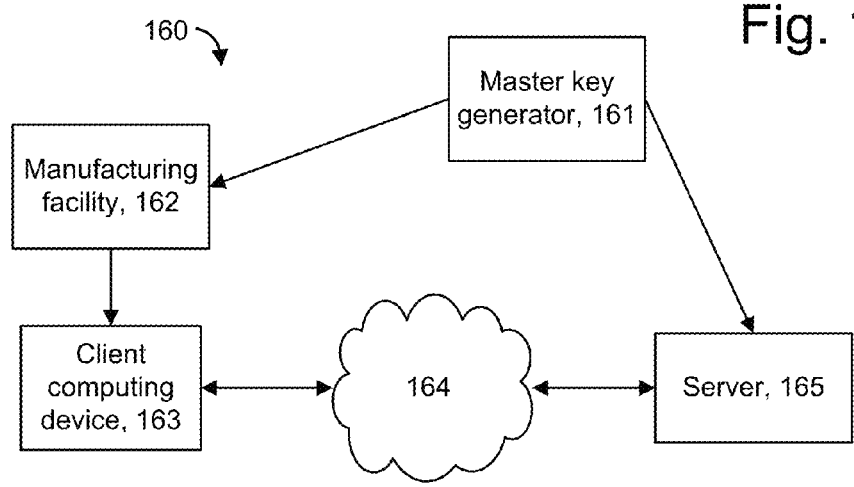
FIG. 1 depicts a computing system 160 in which the genuineness of a client device is ensured.

The technology described herein provides various embodiments for proving that a computing device is genuine. As mentioned, owners of content desire to control how the content is distributed, e.g., to gain revenue from the content and to ensure that the content is appropriate for a computing device to protect the user experience. However, unauthorized individuals may seek to obtain the digital content on an unapproved device. Such devices may provide a hardware and software emulation environment that can access the digital content. In some cases, the user of the device may not know that it is unauthorized such as when the device is innocently obtained from a third party. The use of an unauthorized device can result in a poor user experience, loss of licensing revenue, and valuable secrets being delivered to, and leaked from, the device.

This technology makes it possible to inexpensively query the client hardware to determine if the client hardware is approved, e.g., genuine. The techniques overcome the disadvantages of other approaches. For example, some approaches use a database to store a serial number, a key or other unique data for each client device of a large number of client devices to identify each device individually. However, this involves maintaining a large database, which increases costs. Further, the database could be obtained by unauthorized persons in an attempt to improperly access the digital content.

Another approach is to record an identity certificate or other digital token onto approved client devices. A flaw with this approach is that the identity certificate or other token can be trivially cloned to create another "approved" device. Furthermore, certificates typically require a large amount of data, such as thousands of bits of data, while the techniques described herein involve only perhaps hundreds of bits and can therefore be easily stored in fuses. For example, the fuses can be electronic fuses (E-fuses). This type of fuse is "blown" or set with the application of a higher-than-nominal voltage which results in a substantial increase in resistance. Further, certificates involve the increased complexity of asymmetric encryption.

With asymmetric encryption, a message encrypted using a public key can be decrypted using a corresponding private key. However, this requires a public-private key pair to be configured and maintained for each client device. This can be difficult and costly when there is a large number of client devices. Moreover, asymmetric encryption requires significantly more complex algorithms than symmetric encryption and therefore uses more processing power.

The techniques provide herein include these advantages: no database, very high scalability, use of a small number of a few types of cryptographic operations, no asymmetric cryptography and use of off-the-shelf hardware. Other advantages include a small message size which is exchanged between the client device and a server, and a small amount of data which is stored in the client device, e.g., burned into fuses.

FIG. 1 depicts a computing system 160 in which the genuineness of a client device is ensured. The system includes a master key generator 161 which generates master keys or other key for use by a manufacturing facility 162 and a server 165. The manufacturing facility manufactures client devices such as an example client device 163. This computing device can be, e.g., a laptop, personal computer, game console, tablet, smart phone, wearable computing device or web-enabled television or streaming-media player. Typically, such computing devices are manufactured in large quantities for a mass consumer market. The server is an example, e.g., of one or more web-based servers such as in a content delivery network. A network cloud 164 represents an example communication network such as the Internet by which the client device and the server communicate.

The master key generator can be co-located with the manufacturing facility or located remotely from the manufacturing facility and accessible via a network. Or, the master key generator can be co-located with the server or located remotely from the server and accessible via a network. In one implementation, the master key generator provides four master keys or root secret keys which are used for generating data elements and a key for each of multiple client devices, according to FIG. 6. These master keys are considered first through fourth keys which are used by the server to verify the genuineness of a client device. Moreover, one set of these master keys can be used throughout a project. For example, all client devices manufactured in a calendar year may be part of a project. Advantageously, the master keys need not be frequently generated, so that the cost of generating and maintaining them is low.

Figure 7:
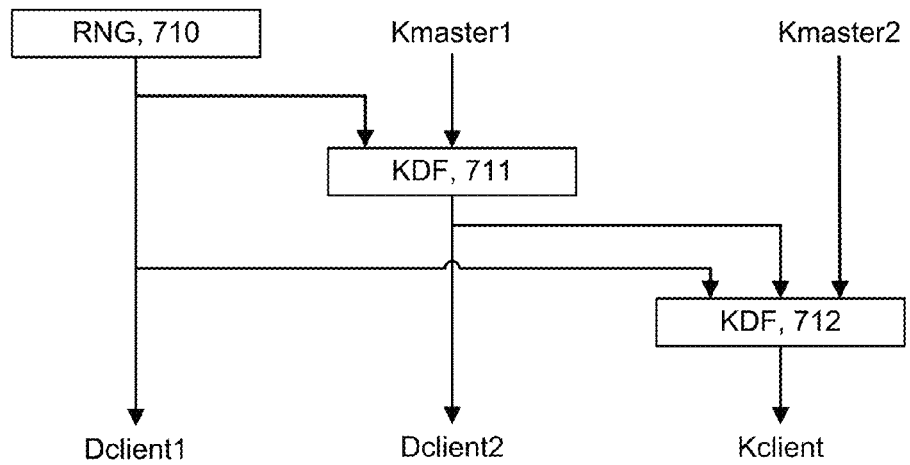
FIG. 7 depicts a block diagram comprising a random number generator (RNG) 710, and key derivation functions (KDFs) 711 and 712, for use in connection with FIG. 5B.

The manufacturing facility uses the master keys to generate a different set of data elements and a key for each client device, e.g., according to FIG. 7.

Figure 2:
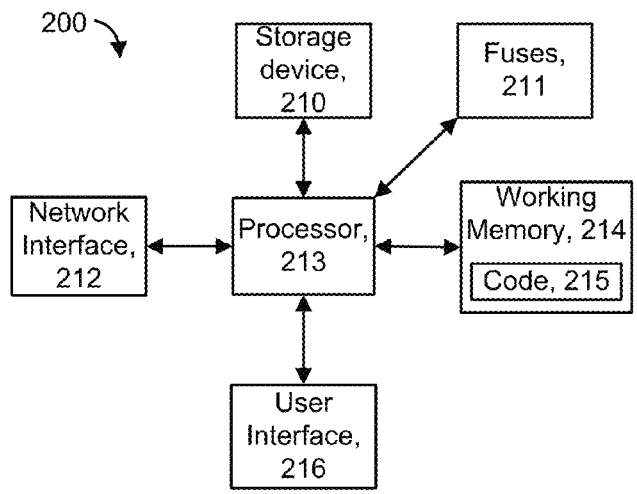
FIG. 2 depicts an example embodiment of a computing device 200 which can represent the client device 163 or the server 165 of FIG. 1.

FIG. 2 depicts an example embodiment of a computing device 200 which can represent the client device 163 or the server 165 of FIG. 1. The computing device includes a storage device 210 such as a hard disk, solid state drive or portable media. These are types of memories which are non-volatile. A network interface 212 such as a network interface card allows the computing device to communicate via the network communication medium 164. A processor 213 executes code in a working memory 214. Further details of the processor are provided in FIGS. 3A and 3B. The working memory may be a volatile type such as RAM which stores code 215 that is loaded from the storage device 210 for use by the processor. A user interface 216 can include a display device, e.g., a screen, and a input device such as a mouse or keyboard, for instance.

Additionally, fuses 211 may be provided to store the data elements and the key of a client device.

The storage device, ROM and working memory are examples of tangible, non-transitory computer- or processor-readable storage devices. Storage devices include volatile and nonvolatile, removable and non-removable devices implemented in any method or technology for storage of information such as computer readable instructions, data structures, program modules or other data. Computer storage devices include RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can accessed by a computer.

Figure 3A:
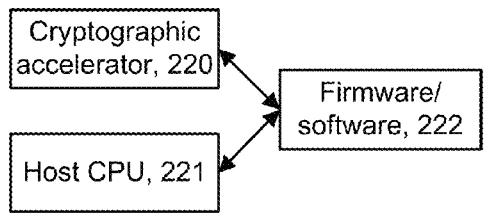
FIG. 3A depicts an example configuration of the processor 213 of FIG. 2 in which a cryptographic accelerator 220 is used.

FIG. 3A depicts an example configuration of the processor 213 of FIG. 2 in which a cryptographic accelerator 220 is used. The cryptographic accelerator communicates with a host CPU 221, and both of them use firmware and/or software 222 to carry out the functionality as described herein. A cryptographic accelerator is a form of a co-processor that performs computationally intensive encoding and decoding tasks. This frees the host CPU to perform other tasks. A cryptographic accelerator can be provided, e.g., in an expansion card on a system motherboard.

Figure 3B:
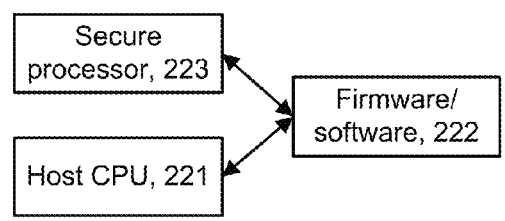
FIG. 3B depicts an example configuration of the processor 213 of FIG. 2 in which a secure crypto-processor 223 is used.

FIG. 3B depicts an example configuration of the processor 213 of FIG. 2 in which a secure crypto-processor 223 is used. The secure crypto-processor communicates with the host CPU 221, and both of them use the firmware and/or software 222 to carry out the functionality as described herein. A secure crypto-processor can be a dedicated computer on a chip or microprocessor for carrying out cryptographic operations, and embedded in a package with physical security measures. Examples include a smart card and a security chip. One or more crypto-processor can be provided in a hardware security module.

Figure 4:
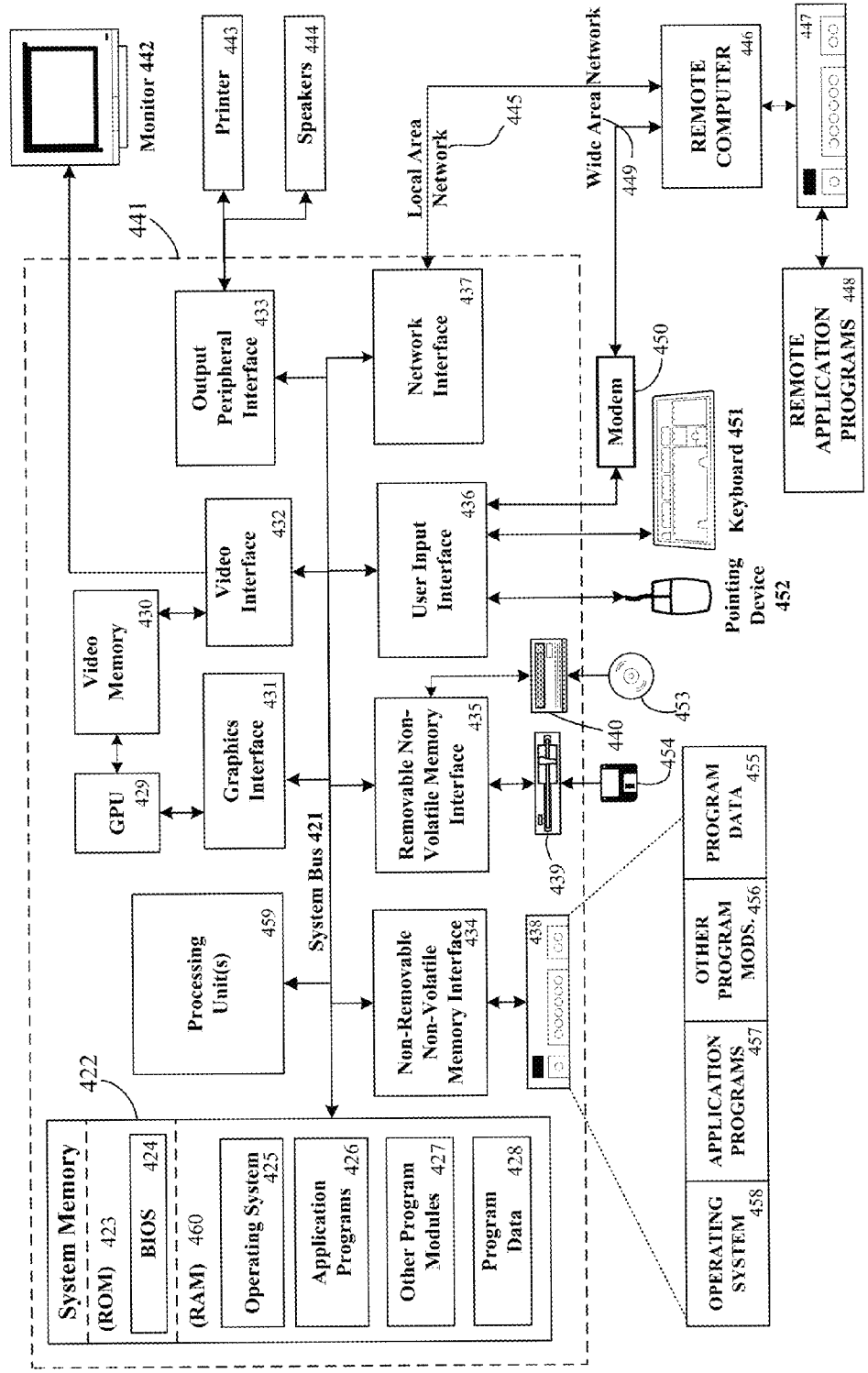
FIG. 4 depicts another example block diagram of the client device 163 or the server 165 of FIG. 1 in the form of a computing system 400.

FIG. 4 depicts another example block diagram of the client device 163 or the server 165 of FIG. 1 in the form of a computing system 400. In an interactive system, the computing system can be used to interpret one or more gestures or other movements and, in response, update a visual space on a display. The computing system comprises a computer 441, which typically includes a variety of tangible computer-readable storage media. This can be any available media that can be accessed by computer and includes both volatile and non-volatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer, such as during start-up, is typically stored in ROM 423. RAM 460 typically contains data and/or program modules that are immediately accessible to and/or presently being operated on by processing unit 459. A graphics interface 431 communicates with a GPU 429. Operating system 425, application programs 426, other program modules 427, and program data 428 are also provided.

The computer may also include other removable/non-removable, volatile/nonvolatile computer storage media, e.g., a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile tangible computer-readable storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media provide storage of computer-readable instructions, data structures, program modules and other data for the computer. For example, hard disk drive 438 is depicted as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to depict that, at a minimum, they are different copies. A user may enter commands and information into the computer through input devices such as a keyboard 451 and pointing device 452, commonly referred to as a mouse, trackball or touch pad. Other input devices may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433.

The computer may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer, although only a memory storage device 447 has been depicted. The logical connections include a local area network (LAN) 445 and a wide area network (WAN) 449, but may also include other networks. Such networking environments are commonplace in offices, enterprise-wide computer networks, intranets and the Internet.

When used in a LAN networking environment, the computer is connected to the LAN 445 through a network interface or adapter 437. When used in a WAN networking environment, the computer typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer, or portions thereof, may be stored in the remote memory storage device. Remote application programs 448 reside on memory device 447. It will be appreciated that the network connections shown are exemplary and other means of establishing a communications link between the computers may be used.

The computing system can include a tangible computer-readable storage device or apparatus having computer-readable software embodied thereon for programming at least one processor to perform methods as described herein. The tangible computer-readable storage device can include, e.g., one or more of components 422, 434, 435, 430, 453 and 454. Further, one or more processors of the computing system can provide processor-implemented methods as described herein. The GPU 429 and the processing unit 459 are examples of processors.

Figure 5A:
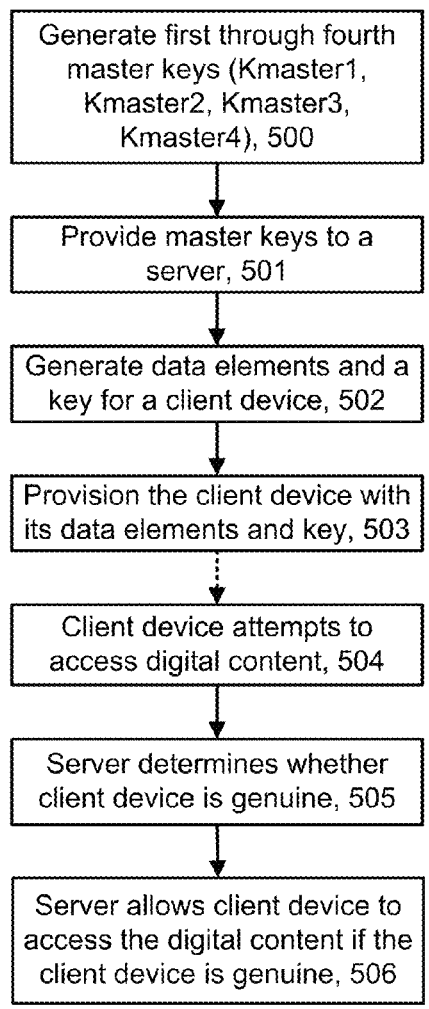
FIG. 5A depicts an overview of a process for ensuring the genuineness of a client device.

FIG. 5A depicts an overview of a process for ensuring the genuineness of a client device. Step 500 includes generating first through fourth master keys, Kmaster1, Kmaster2, Kmaster3 and Kmaster4, such as by using the random number generator (RNG) 610 of FIG. 6. Step 501 includes providing the master keys to one or more servers. For example, the master keys can be stored at a server or made available to a server via a network. The server is also configured with information regarding some of the processes used by the client device such as key derivation functions, as discussed further below. Step 502 includes generating data elements and a key for a client device as discussed further, e.g., in connection with FIG. 5B. This can occur separately for a number of different devices. Step 503 includes provisioning a client device with its data elements and key, such as by storing the data elements and key in its fuses.

Some time later, after the client device is in the hands of the end user, for instance, the client device attempts to access digital content, at step 504. For instance, the user may enter a command via a user interface to access the content. One example is requesting multimedia content such as a movie. Another example is requesting software which is designed to be installed and run at the client device. The command can be provided as a request to a server. At step 505, the server determines whether the client device is genuine, as discussed further, e.g., in connection with FIG. 5C. At step 506, the server allows the client device to access the content if the client device is genuine. For example, the server can deliver, to the client device, the digital content and/or a decryption key for decrypting the digital content. In one approach, a single server performs steps 505 and 506. In another approach, a first server performs step 505 and a second server performs step 506 in response to the first server. In one possible approach, the digital content is already stored at the client device or connected to the client device as via a peripheral device. In this case, the client device uses the decryption key for decrypting the digital content.

Figure 5B:
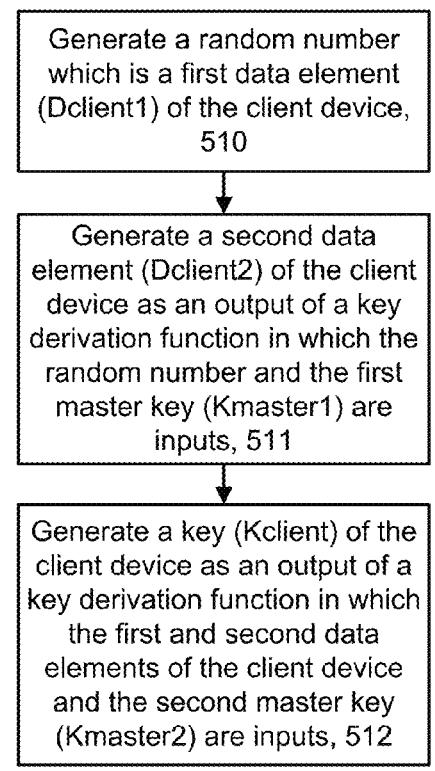
FIG. 5B depicts further details of an example embodiment for step 502 of FIG. 5A.

FIG. 5B depicts further details of an example embodiment for step 502 of FIG. 5A. Step 510 involves generating a random number which is a first data element (Dclient1) of a client device, such as by using a RNG 710 (FIG. 7). Step 511 involves generating a second data element (Dclient2) of the client device as an output of the key derivation function (KDF) 711 of FIG. 7 in which the random number (Dclient1) and the first master key (Kmaster1) are inputs. Step 512 involves generating a key (Kclient) of the client device as an output of a key derivation function (KDF) 712 of FIG. 7 in which the first and second data elements (Dclient1 and Dclient2, respectively) of the client device and the second master key (Kmaster2) are inputs.

Figure 5C:
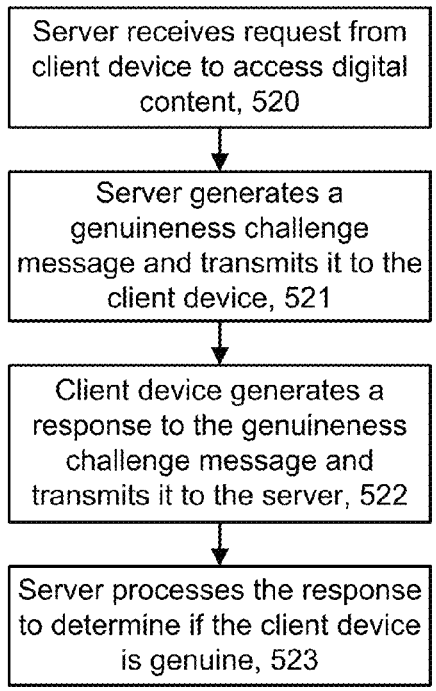
FIG. 5C depicts further details of an example embodiment for step 505 of FIG. 5A.

FIG. 5C depicts further details of an example embodiment for step 505 of FIG. 5A. At step 520, the server receives a request from a client device to access digital content. The request can include information such as a network address of the client device, an identifier of an account associated with the client device, and an identifier of the requested content. The server may perform preliminary checks such as ensuring the account number is valid and in good standing. At step 521, the server generates a genuineness challenge message and transmits it to the client device. This message is intended to be used to determine that the client device is authorized to access the requested content. See FIG. 5D for further details. At step 522, the client device generates a response to the genuineness challenge message and transmits it to the server via a network. See FIG. 5E for further details. At step 523, the server processes the response to determine if the client is genuine. See FIG. 5F for further details.

Figure 5D:
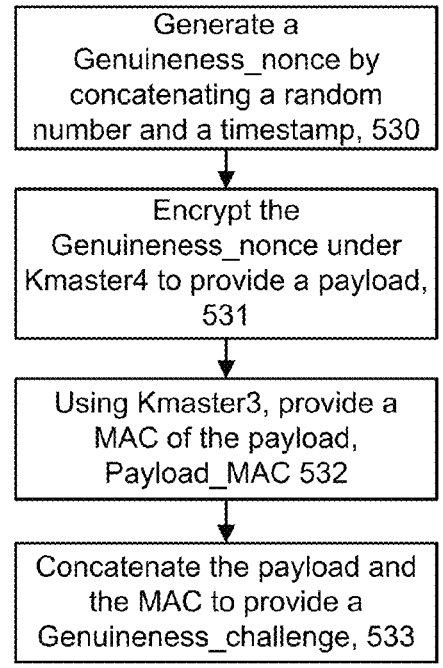
FIG. 5D depicts further details of an example embodiment for step 521 of FIG. 5A.
Figure 8:
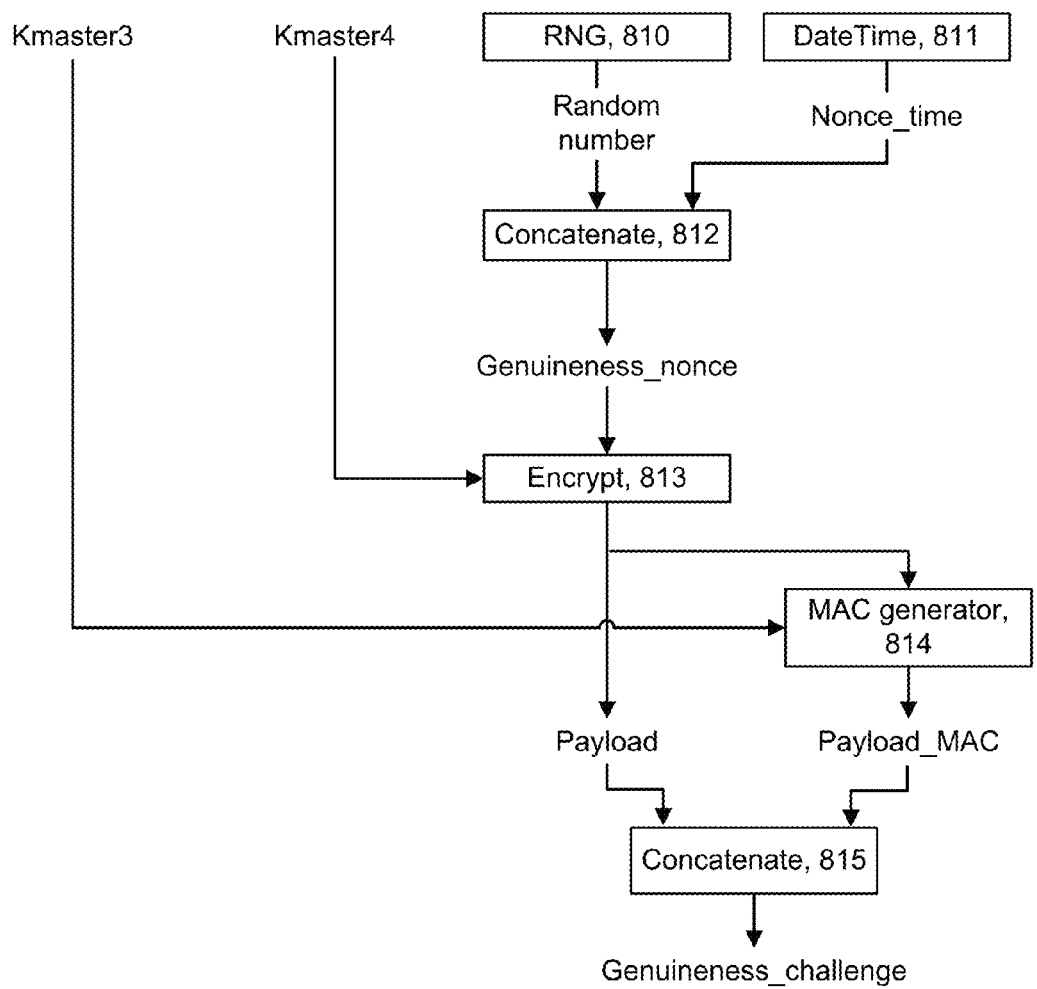
FIG. 8 depicts a block diagram comprising a random number generator (RNG) 810, a DateTime process 811, Concatenate processes 812 and 815, an Encrypt process 813, and a MAC generator 814, for use in connection with FIG. 5D.

FIG. 5D depicts further details of an example embodiment for step 521 of FIG. 5A. Referring also to FIG. 8, at step 530, the server generates a Genuineness_nonce by concatenating a random number and a timestamp. A nonce is an arbitrary number used only once in a cryptographic communication and ensures that there is a time limit in which the client device must correctly respond to the genuineness challenge message. At step 531, the server encrypts the Genuineness_nonce under Kmaster4, e.g., using the Encrypt process 813 of FIG. 8, to provide a payload. At step 532, the server uses Kmaster3 to provide a MAC of the payload, Payload_MAC, e.g., using the MAC generator 814 of FIG. 8. At step 533, the server concatenates the payload and the MAC to provide the Genuineness_challenge message.

Figure 5E:
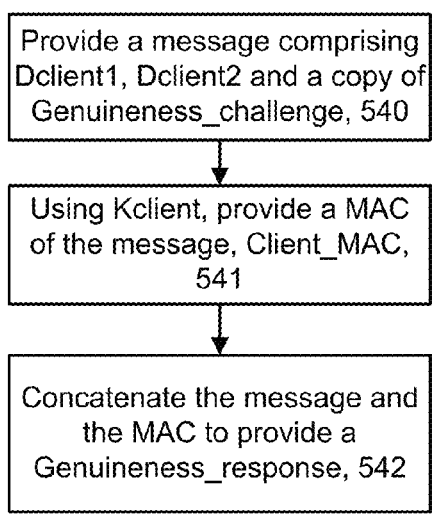
FIG. 5E depicts further details of an example embodiment for step 522 of FIG. 5A.

FIG. 5E depicts further details of an example embodiment for step 522 of FIG. 5A. At step 540, the client device provides a message comprising Dclient1, Dclient2 and a copy of the Genuineness_challenge message, referred to as Genuineness_challenge_c. See FIG. 9 for further details. For a genuine client device, the copy of Genuineness_response is the same as the original. However, the notation "_c" is used to denote a putative copy of data which may be treated differently than the original version of the data by the server until the server verifies the copy. At step 541, the client device uses Kclient to provide a MAC of the message, Client_MAC, e.g., using the MAC generator 911 of FIG. 9. Dclient1 and Dclient2 are therefore shared data elements of the client device while Kclient is a non-shared key of the client device. At step 542, the client device concatenates the message and the MAC (Client_MAC) to provide a genuineness response message, Genuineness_response, e.g., using the Concatenate process 910 of FIG. 9.

Figure 5F:
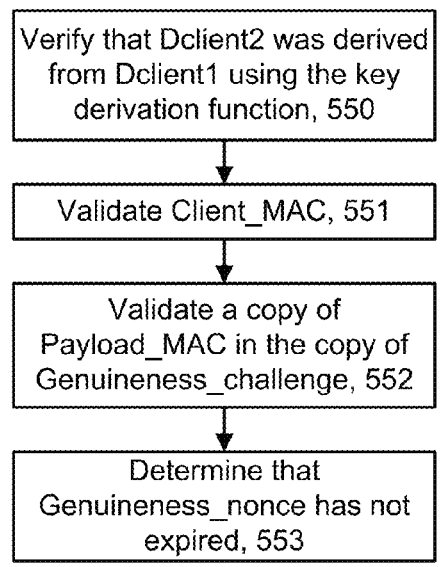
FIG. 5F depicts further details of an example embodiment for step 523 of FIG. 5A.

FIG. 5F depicts further details of an example embodiment for step 523 of FIG. 5A. At step 550, the server verifies that Dclient2 was derived from Dclient1 using the key derivation function 711 of FIG. 7. That is, the server verifies that Dclient2 was correctly derived from Dclient1 using a process known to the server. See FIG. 11 for further details. At step 551, the server validates Client_MAC. See FIG. 13 for further details. At step 552, the server validates a copy of the payload MAC (Payload_MAC_c) which was included in the copy of Genuineness_challenge (i.e., Genuineness_challenge_c) in the Genuineness_response message, See FIG. 15 for further details. At step 553, the server determines that Genuineness_nonce has not expired. See FIG. 16 for further details.

The blocks in FIG. 6-16 can be hardware blocks of circuits and/or logic blocks representing functions or processes performed by a processor under the control of firmware and/or software. Further, the following terms are used.

KDF is a Key Derivation Function. For example, this can be a National Institute of Standards and Technology (NIST)-approved, cryptographically strong KDF. In one approach, the KDF is not used in the client device so that the client device is simplified and details of the KDF cannot be obtained from the client device. Instead, a KDF is used by the server. In cryptography, a KDF derives one or more data elements such as secret keys from a secret value such as a master key or other known information such as a password or passphrase using a pseudo-random function. A keyed cryptographic hash function is an example of a pseudo-random functions. A KDF prevents an unauthorized person who gains possession of the output of the KDF from learning about the input to the KDF.

RNG is a Random Number Generator which is cryptographically strong. In one approach, the RNG is not used in the client device so that the client device is simplified and details of the RNG cannot be obtained from the client device. The RNG can include a pseudorandom number generator which generates an apparently random output based on a seed.

A Message Authentication Code (MAC) generator is a process which generates a message authentication code of a message. One example is a keyed MAC in which the MAC is provided for a message using an input key. The MAC generator can be a cryptographically strong, NIST-approved MAC such as the Advanced Encryption Standard (AES) Cipher-based MAC (CMAC). A MAC differs from a digital signature in that MAC values are both generated and verified using the same secret key. This implies that the sender and receiver of a message are in possession of the same key before initiating communications, as is the case with symmetric encryption/decryption. In contrast, a digital signature is generated using the private key of a public-private key pair.

An Encryption process can be symmetric encryption which is cryptographically strong. An example is a NIST-approved cipher such as AES executed in encrypt mode. Another example is the use of the Data Encryption Standard (DES) or Triple DES.

A Decryption process can be symmetric decryption, This is the same cipher as in the Encryption process, executed in decrypt mode.

K can denote a symmetric cryptographic key. The usage of the key is indicated by the subscript. These are secret keys that are used with the cipher and/or keyed MAC.

In a Concatenate process, all inputs are linked together into a single unit. This can be a standard concatenate function which uses no cryptography.

In a Separate process, pieces of a single input are split into multiple outputs. This can be a utility function which uses no cryptography.

Figure 6:
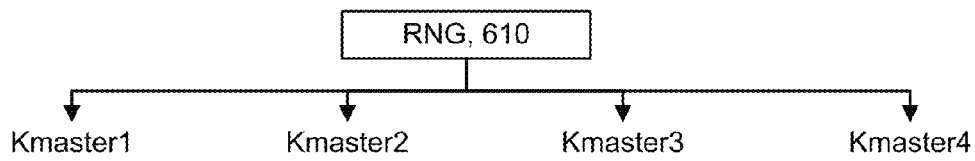
FIG. 6 depicts a block diagram comprising a random number generator (RNG) 610 for use in connection with step 500 of FIG. 5A.

FIG. 6 depicts a block diagram comprising a random number generator (RNG) 610 for use in connection with step 500 of FIG. 5A. The RNG can be used four separate times to provide four separate keys, Kmaster1-Kmaster4. These can be root secret keys which are generated once per project, or at some other level of granularity. These root secret keys are utilized by the manufacturing facility and one or more servers which provide a service by which client devices access digital content. While an RNG shown, this is not required. Root secret keys could originate from some other means such as a KDF. Note that the term "random" is meant to include pseudorandom. These keys should be protected using strong measures. Each key can be 128 bits, as an example.

FIG. 7 depicts a block diagram comprising a random number generator (RNG) 710, and key derivation functions (KDFs) 711 and 712, for use in connection with FIG. 5B. This relates to generating data elements and a key for each client device. Each client device is provisioned with a unique device key (Kclient) along with two other device data elements, Dclient1 and Dclient2. Dclient1 is the random number output from the RNG 710. Dclient2 is an output of the KDF 711, where Dclient1 and Kmaster1 are inputs to the KDF. Kclient is an output of the KDF 712, where Dclient1, Dclient2 and Kmaster2 are inputs to the KDF. Note that Kclient is a function of two secret keys, so an unauthorized person would need to know both of these keys. Further, the server knows the KDFs and the master keys, so it can verify that Dclient2 was generated from Dclient1 using KDF 711 and Kmaster1, as discussed in FIG. 11. Moreover, since the RNG and the KDFs are not included in the client device, an unauthorized person cannot learn of them by analyzing the client device hardware, firmware and/or software. Each value can be 128 bits, as an example.

The data elements Dclient1 and Dclient2 have the characteristics of cryptographic keys but are not used to provide encrypted data in an example embodiment, FIG. 8 depicts a block diagram comprising a random number generator (RNG) 810, a DateTime process 811, Concatenate processes 812 and 815, an Encrypt process 813, and a MAC generator 814, for use in connection with FIG. 5D. This relates to the server-side genuineness challenge. In order to prevent replay of responses to genuineness challenges, the server can provide a challenge with a special nonce (Nonce_time) that has the date/time embedded in it. Specifically, the server can use an RNG 810 to produce a random number (e.g., 96 bits in length). A DateTime process 811, as a timestamp generator, produces a value Nonce_time (e.g., 32 bits in length), which can include a timestamp indicating the current date and time. The random number and Nonce_time are joined by a Concatenate process 812 to produce a value, Genuineness_nonce. Genuineness_nonce is encrypted at an Encrypt process 813 under Kmaster4 to produce a message, Payload. This message is input to a MAC generator 814 which is keyed by Kmaster3 to produce a MAC value, Payload_MAC. Payload and Payload_MAC are joined by a Concatenate process 815 to produce a value, Genuineness_challenge. This is a message which is sent from the server to the client device. Note that communications between the server and the client device can be made using any network protocol. The protocol can include an additional encryption component as well.

Figure 9:
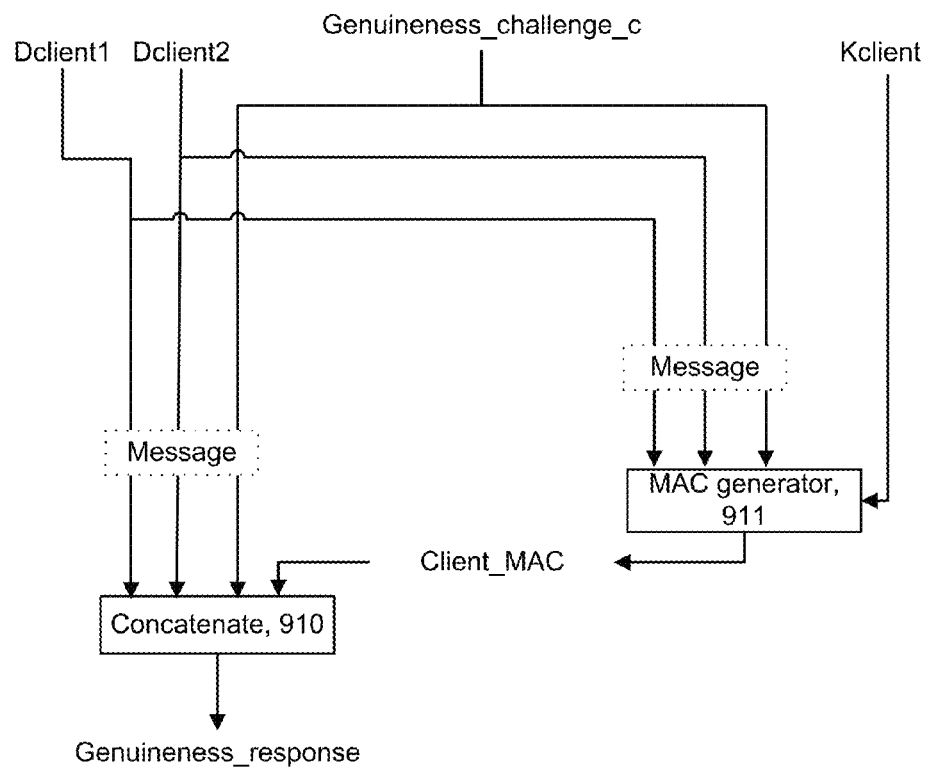
FIG. 9 depicts a block diagram comprising a Concatenate process 910 and a MAC generator 911, for use in connection with FIG. 5E.

FIG. 9 depicts a block diagram comprising a Concatenate process 910 and a MAC generator 911, for use in connection with FIG. 5E. This relates to client device-side genuineness response generation. When the client device receives a genuineness challenge, it will compose a message that includes the device data elements (Dclient1 and Dclient2) and a copy of the incoming genuineness challenge, Genuineness_challenge_c (which includes a copy of the Payload, Payload_c and a copy of the Payload MAC, Payload_MAC_c). Further, a MAC for the message, Client_MAC, is provided by a MAC generator 911. The message and Client_MAC are joined by a Concatenate process 910 to produce a value, Genuineness_response. This is a message which is sent from the client device to the server.

Note that the processing and data storage requirements of the client device relating to preparing the response are relatively small. The client device can store Dclient1, Dclient2 and Kclient in fuses. Additional hardware, firmware and/or software is used to provide the MAC generator and the Concatenate process 910. However, this is essentially the extent of the resources which are used at the client device. The techniques described herein are therefore very lightweight in terms of the burden on the client device. This is particularly desirable to reduce the costs of mass-marketed consumer devices as well as to minimize the amount of information which might be discovered by an unauthorized person.

Further, the client device can provide the data elements to the server without encryption. Encryption could be used by some network transport protocol. However, the techniques provided herein provide proper cryptographic protection and require no confidentiality, integrity, or other security properties from the network transport protocol.

Figure 10:
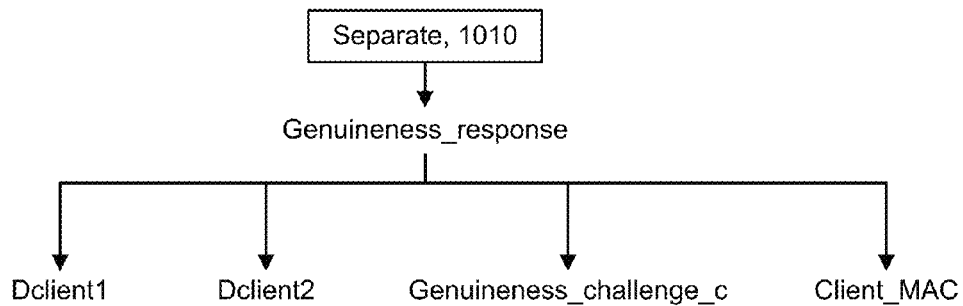
FIG. 10 depicts a block diagram comprising a Separate process 1010, for use in connection with step 550 of FIG. 5F.

FIG. 10 depicts a block diagram comprising a Separate process 1010, for use in connection with step 550 of FIG. 5F. This is a start of the server-side genuineness response validation. In an example implementation, the server performs seven main operations in order to prove the genuineness of a client device from its genuineness response, as described in FIG. 10-16. The first operation is to split the genuineness response into its primary components, Dclient1, Dclient2, Genuineness_challenge_c and Client_MAC, using a Separate process 1010.

Figure 11:
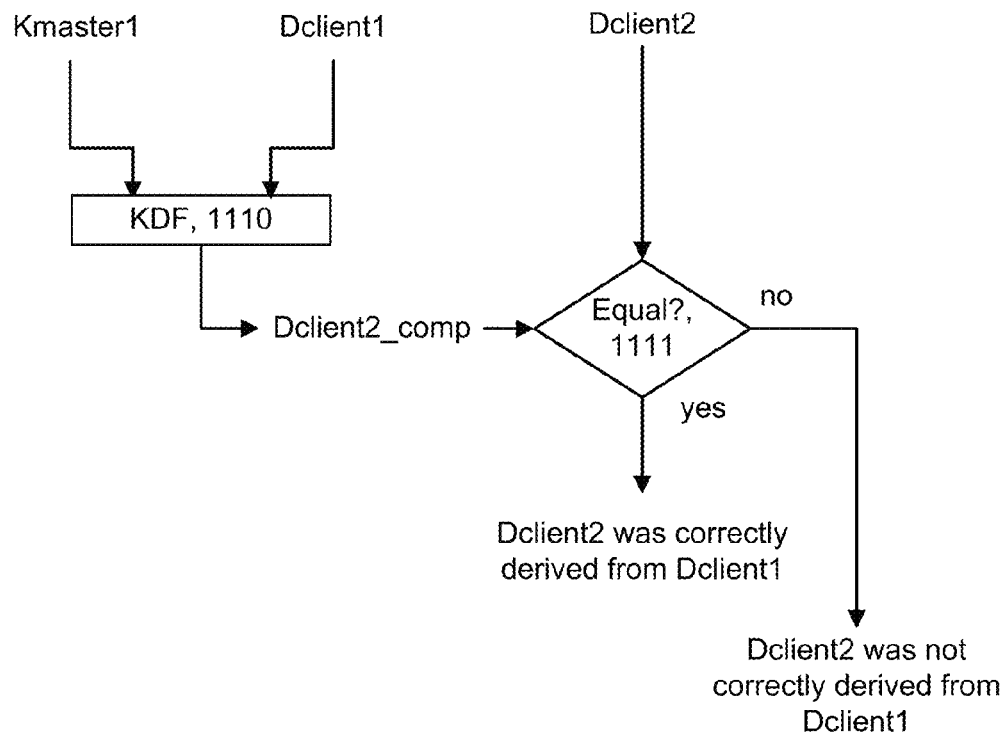
FIG. 11 depicts a block diagram comprising a key derivation function (KDF) 1110 and a comparison function 1111, for use in connection with step 550 of FIG. 5F.

FIG. 11 depicts a block diagram comprising a key derivation function (KDF) 1110 and a comparison function 1111, for use in connection with step 550 of FIG. 5F. Here, the server determines if the supplied Dclient2 is a proper cryptographic derivative of Dclient1 using the same steps used for originally provisioning the device (see FIG. 7). If Dclient2 is not a proper cryptographic derivative of Dclient1, e.g., Dclient2 is not an output of KDF 711 when Dclient1 and Kmaster1 are inputs, then the client device is determined to be not genuine. Otherwise, the genuineness response validation process continues. See also FIG. 17.

Specifically, a KDF 1110, which can be the same as the KDF 711, calculates a comparison value, Dclient2_comp, where Kmaster1 and Dclient1 are inputs. Dclient2_comp is compared to Dclient2 at a comparison function 1111. If these two values are equal, Dclient2 was correctly derived from Dclient1. If these two values are not equal, Dclient2 was not correctly derived from Dclient1.

Figure 12:
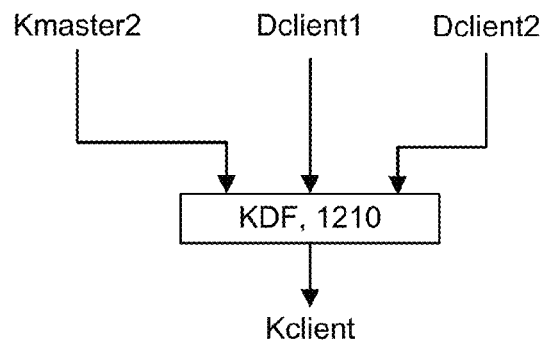
FIG. 12 depicts a block diagram comprising a key derivation function (KDF) 1210, for use in connection with step 551 of FIG. 5F.

FIG. 12 depicts a block diagram comprising a key derivation function (KDF) 1210, for use in connection with step 551 of FIG. 5F. Here, the server derives Kclient using the same steps as used for originally provisioning the client device. Specifically, a KDF 1210, which can be the same as the KDF 712, calculates Kclient as an output, where Kmaster2, Dclient1 and Dclient2 are inputs. Thus, even though the client device does not share Kclient with the server, the server can calculate Kclient. This prevents an unauthorized person from attempting to obtain Kclient from network traffic between the client device and the server, for instance, since Kclient is not in the traffic.

Figure 13:
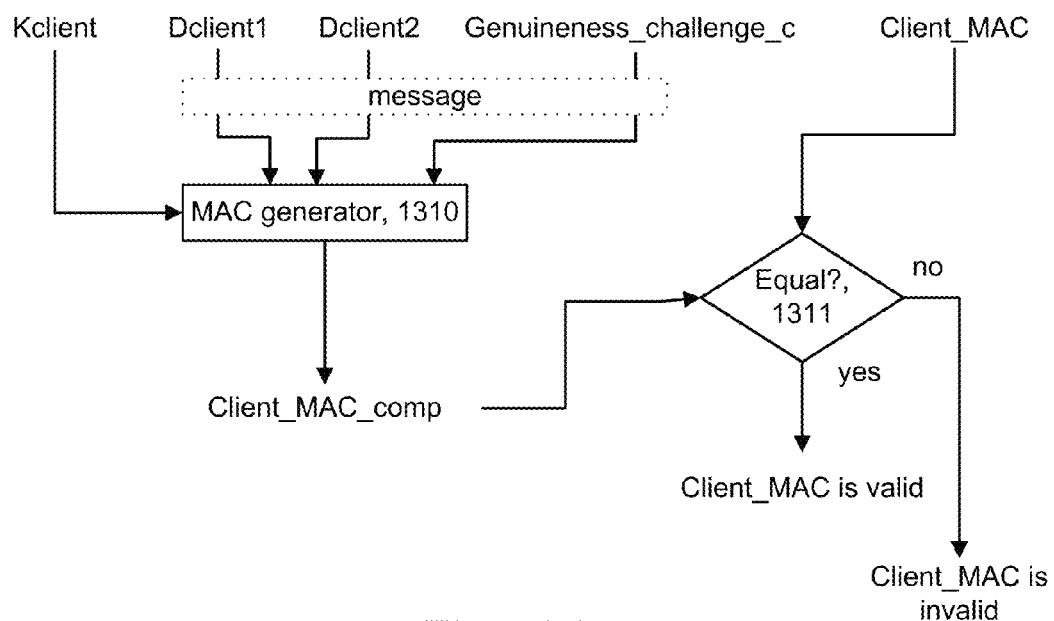
FIG. 13 depicts a block diagram comprising a MAC generator 1310 and a comparison function 1311, for use in connection with step 551 of FIG. 5F.

FIG. 13 depicts a block diagram comprising a MAC generator 1310 and a comparison function 1311, for use in connection with step 551 of FIG. 5F. After calculating Kclient, the server verifies that the client had use of Kclient by utilizing it to verify the client MAC in the genuineness response. If the MAC is invalid, the client device is determined to be not genuine. Specifically, the message from the client device, which includes Dclient1, Dclient2 and Genuineness_challenge_c, is input to a MAC generator 1310 (corresponding to the MAC generator 911), which is keyed by Kclient. An output of the MAC generator is a comparison value, Client_MAC_comp. Client_MAC_comp is compared to Client_MAC at a comparison function 1311. If these two values are equal, Client_MAC is valid. If these two values are not equal, Client_MAC is invalid and the client device is determined to be not genuine.

Figure 14:
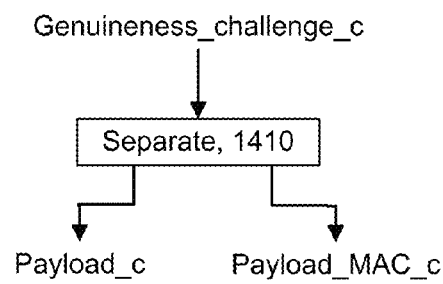
FIG. 14 depicts a block diagram comprising a Separate process 1410, for use in connection with step 552 of FIG. 5F.

FIG. 14 depicts a block diagram comprising a Separate process 1410, for use in connection with step 552 of FIG. 5F. The server uses the Separate process 1410 to separate the copy of the genuineness challenge into its major components, i.e., Payload_c (a presumed copy of Payload) and Payload_MAC_c (a presumed copy of Payload_MAC).

Figure 15:
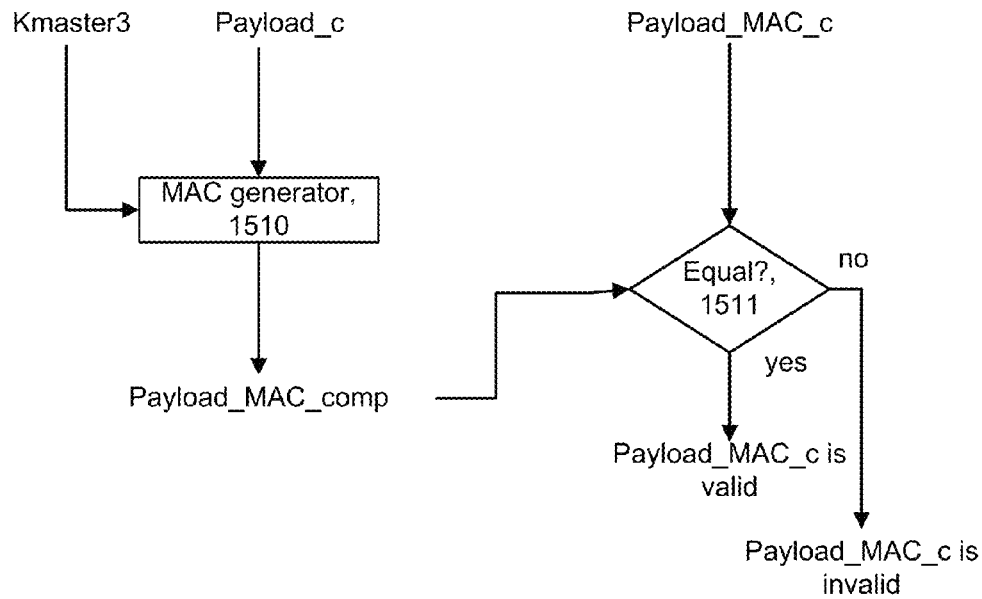
FIG. 15 depicts a block diagram comprising a MAC generator 1510 and a comparison function 1511, for use in connection with step 552 of FIG. 5F.

FIG. 15 depicts a block diagram comprising a MAC generator 1510 and a comparison function 1511, for use in connection with step 552 of FIG. 5F. The server verifies that the genuineness challenge returned in the genuineness response did in fact originate with the server by using Kmaster3 to verify the payload MAC. Specifically, Payload_c as received in the message from the client device is input to the MAC generator 1510 (corresponding to the MAC generator 814), which is keyed by Kmaster3. An output of the MAC generator is a comparison value, Payload_MAC_comp. Payload_MAC_comp is compared to Payload_MAC_c at a comparison function 1511. If these two values are equal, Payload_MAC_c is valid. If these two values are not equal, Payload_MAC_c is invalid and the client device is determined to be not genuine.

Figure 16:
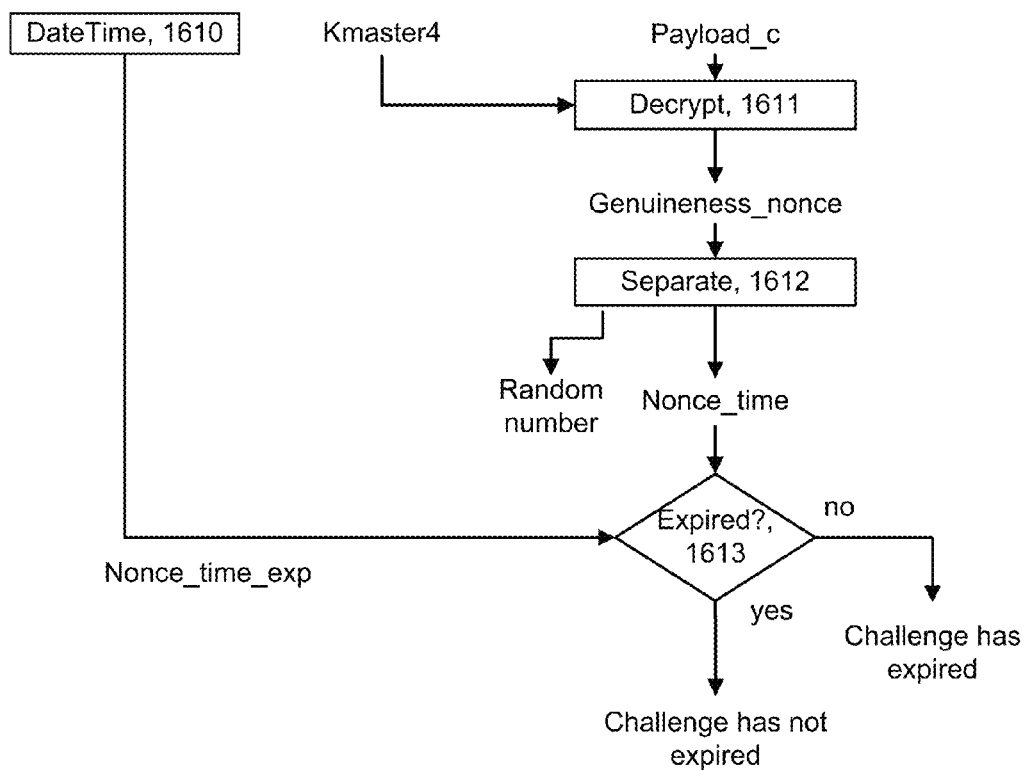
FIG. 16 depicts a block diagram comprising a DateTime process 1610, a Decrypt process 1611, a Separate process 1612 and a comparison function 1613, for use in connection with step 553 of FIG. 5F.

FIG. 16 depicts a block diagram comprising a DateTime process 1610, a Decrypt process 1611, a Separate process 1612 and a comparison function 1613, for use in connection with step 553 of FIG. 5F. A final step is for the server to verify that the nonce contained in the embedded genuineness challenge is not expired. This test is used to prevent replay of older genuineness responses. If the nonce is expired, the client device is determined to be not genuine.

The DateTime process 1610 is used to produce a value Nonce_time_exp, which includes a timestamp with the expiration date and time. A Decrypt process 1611, which is a reverse process of the Encrypt process 813, decrypts Payload_c using Kmaster4 to provide Genuineness_nonce, which is expected to be the same value provided in FIG. 8. A Separate process 1612 outputs a random number, which is discarded, and Nonce_time, which is expected to be the same value provided in FIG. 8. Nonce_time, the start time of the challenge, and Nonce_time_exp, the expiration time of the challenge, are compared at a comparison function 1613 to determine whether the challenge has expired, e.g., whether the time represented by Nonce_time is after the time represented by Nonce_time_exp. If this is true, the challenge has expired. If this is not true, the challenge has not expired. The expiration time of a challenge can be set by the server, e.g., as a period of a few seconds or minutes.

Figure 17:
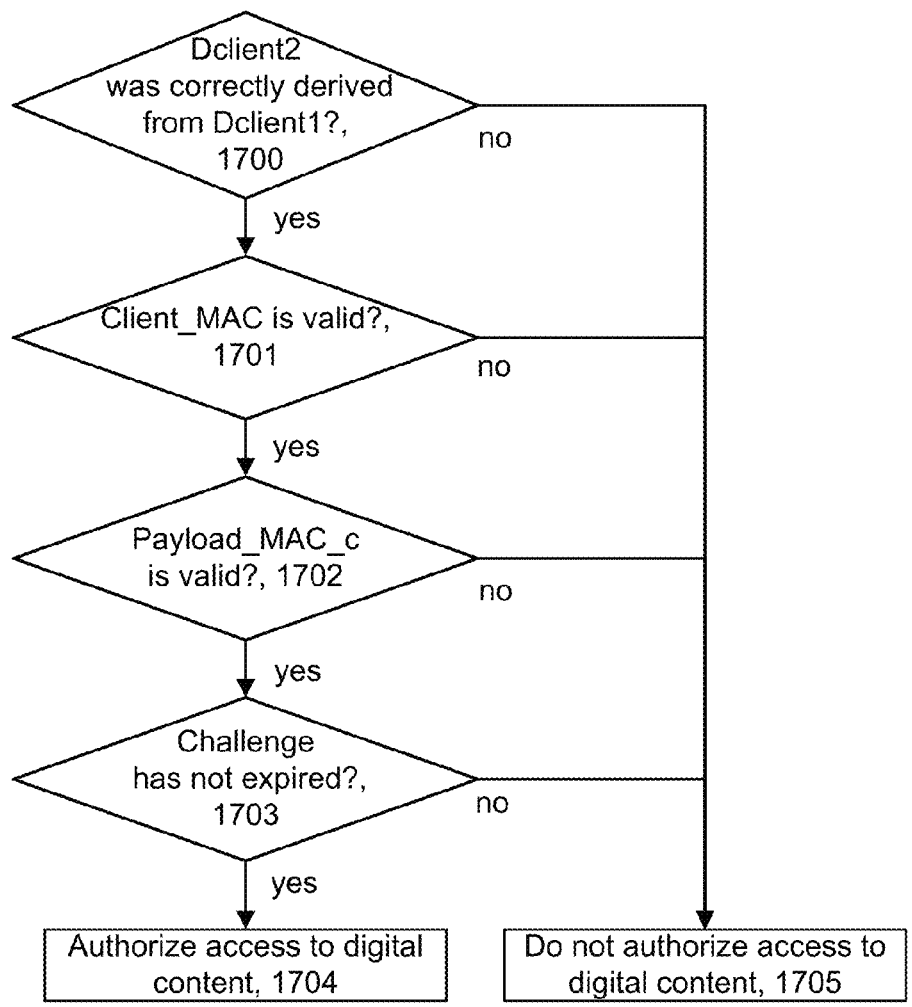
FIG. 17 depicts a process in which a server determines whether to allow access to digital content consistent with step 505 of FIG. 5A and with FIGS. 11, 13, 15 and 16.

FIG. 17 depicts a process in which a server determines whether to allow access to digital content consistent with step 505 of FIG. 5A and with FIGS. 11, 13, 15 and 16. A decision step 1700 determines if Dclient2 was correctly derived from Dclient1. If this is false, step 1705 is invoked to not allow access to the digital content. In this case, the client device may display a message indicating that access has been denied. If step 1700 is true, step 1701 determines if Client_MAC is valid. If this is false, step 1705 is invoked. If step 1701 is true, step 1702 determines if Payload_MAC is valid. If this is false, step 1705 is invoked. If step 1702 is true, step 1703 determines if the challenge has not expired. If this is false, step 1705 is invoked. If step 1703 is true, step 1704 authorizes access to the requested digital content.

As mentioned, a server can determine the genuineness of a client device in response to the client device requesting access to digital content. However, this determination could be made at other times as well. For example, a server can determine the genuineness of a client device in response to the client device communicating information to the server, such as status information regarding the health of the client device. Or, the server can initiate the sending of a genuineness challenge to a client device. For instance, this could be done periodically to confirm that the client device is genuine.

Figure 18:
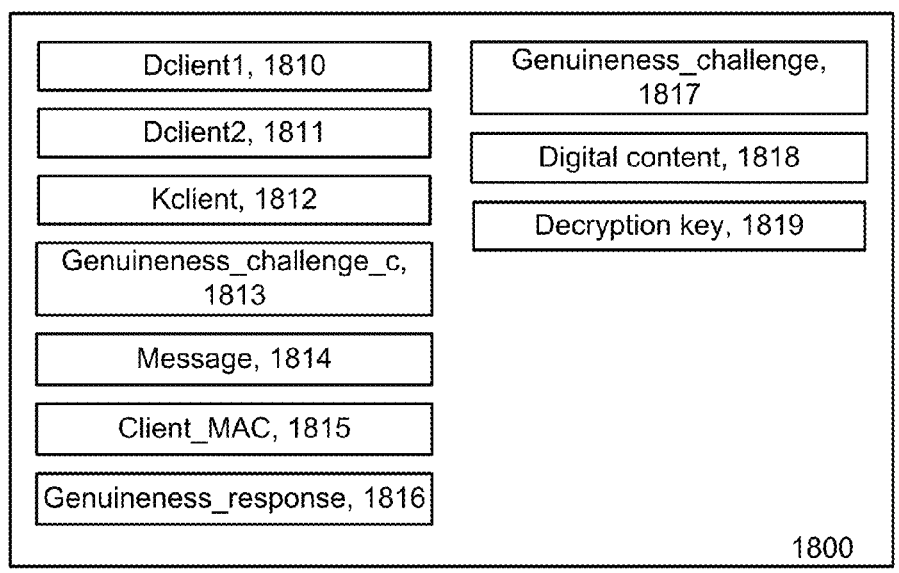
FIG. 18 depicts an example data structure which stores data fields at a client device.

FIG. 18 depicts an example data structure 1800 which stores data fields at a client device. The client device can have a database or other data structure which maintains the different fields of data which are depicted. In some cases, the fields are initially empty. The fields can be updated at different times such as when the client device requests digital content, receives a genuineness challenge, prepares a response to the genuineness challenge and receives digital content or a decryption key for the digital content. The updating of the data fields represents a physical transformation of the client device, e.g., in its memory. Further, the data fields on the left side of the figure represent data which is typically provided by the client device. These data fields include: Dclient1, 1810; Dclient2, 1811; Kclient, 1812; Genuineness_challenge_c, 1813; Response_message, 1814; Client_MAC, 1815; and Genuineness_response, 1816.

The data fields on the right side of the figure represent data which is typically received by the client device. These data fields include: Genuineness_challenge, 1817; Digital content, 1818; and Decryption key, 1819.

FIG. 19 depicts an example data structure 1900 which stores data fields at a server computing device. The updating of the data fields represents a physical transformation of the server, e.g., in its memory. Further, the data fields on the left side of the figure represent data which is typically provided by the server. These data fields include: Kmaster1, 1910; Kmaster2, 1911; Kmaster3, 1912; Kmaster4, 1913; Random number output of RNG, 1914; Nonce_time, 1915; Nonce_time_exp, 1916; Genuineness_nonce, 1917; Payload, 1918; Payload_MAC, 1919; Payload_MAC_comp, 1920; Genuineness_challenge, 1921; Dclient2_comp, 1922; Kclient, 1923; Client_MAC_comp, 1924; Validity flag for client data elements, 1925; Validity flag for client MAC, 1926; Validity flag for payload MAC, 1927; Flag for expiration, 1928; Flag for authorizing access to digital content, 1929; Digital content, 1930; Decryption key, 1931; Payload_c, 1932; Payload_MAC_c, 1933; Genuineness_challenge_c, 1934; Genuineness_response, 1935; Dclient1, 1936; Dclient2, 1937; and Client_MAC, 1938.

The validity flag 1925 may be set based on a result of the comparison function 1111 or the decision step 1700. The validity flag 1926 may be set based on a result of the comparison function 1311 or the decision step 1701. The validity flag 1927 may be set based on a result of the comparison function 1511 or the decision step 1702. The flag 1928 may be set based on a result of the comparison function 1613 or the decision step 1703. The flag 1929 may be set based on a result of the decision steps 1700-1703.

The data fields on the right side of the figure represent data which is typically received by the server. These data fields include: Payload_c, 1932; Payload_MAC_c, 1933; Genuineness_challenge_c, 1934; Genuineness_response, 1935; Dclient1, 1936; Dclient2, 1937; and Client_MAC, 1938.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method at a server to ensure the genuineness of a client device, comprising:
    receiving a request from the client device to access digital content;
    in response to the request, issuing a genuineness challenge to the client device, the genuineness challenge comprises a payload and a message authentication code of the payload which are generated by the server;
    pursuant to the issuing, receiving a response from the client device, wherein:
        the response comprises a message and a message authentication code of the message which are generated by the client device,
        the message comprising first and second data elements of the client device and a copy of the genuineness challenge,
        the copy of the genuineness challenge comprising a copy of the payload and a copy of the message authentication code of the payload,
        the message authentication code of the message is a function of a key of the client device and of the copy of the genuineness challenge, and
        the key of the client device is not shared with the server;
    to verify that the second data element was derived from the first data element, calculating a comparison value of the second data element by inputting the first data element of the client device and a first secret key of the server to a first key derivation function, and verifying that the comparison value of the second data element matches the second data element of the client device in the response;
    to calculate the key of the client device using the first and second data elements in the response, to provide a calculated key, inputting the first and second data elements of the client device and a second secret key of the server to a second key derivation function;
    validating the message authentication code of the message by using the message and the calculated key to provide a comparison message authentication code of the message, and verifying that the comparison message authentication code of the message matches the message authentication code of the message which is generated by the client device;
    validating the copy of the message authentication code of the payload by using the copy of the payload to provide a comparison message authentication code of the payload, and verifying that the comparison message authentication code of the payload matches the message authentication code of the payload which is generated by the server; and
    responsive to the verifying that the second data element was derived from the first data element, the validating the message authentication code of the message and the validating the copy of the message authentication code of the payload, fulfilling the request by the client device to access the digital content, wherein the genuineness of the client device is ensured without using asymmetric cryptography.

2. The method of claim 1, further comprising:
    decrypting the payload using a key of the server to obtain a nonce from the payload, the nonce comprising a timestamp, and verifying that the nonce has not expired, the fulfilling of the request is responsive to the verifying that the nonce has not expired.

3. The method of claim 1, wherein:
    the issuing the genuineness challenge is responsive to receipt of a request from the client device for the digital content.

4. The method of claim 1, wherein:
    the server fulfils the request the client device to access the digital content without comparing any of the first and second data elements and the calculated key to a database of keys.

5. The method of claim 1, wherein:
    the first and second data elements and the calculated key are unique to the client device.

6. The method of claim 1, wherein:
    a same key of the server is used to provide the message authentication code of the payload, and to provide the comparison message authentication code of the payload.

7. The method of claim 1, wherein:
    the fulfilling the request comprises transmitting the digital content to the client device.

8. The method of claim 1, wherein:
    the fulfilling the request comprises transmitting a key to the client device for use in decrypting the digital content.

9. The method of claim 1, wherein:
    the genuineness of the client device is ensured without the server using a database which stores unique data for the client device.

10. A computing device, comprising:
    a storage device which stores code; and
    a processor associated with the storage device, the processor is configured to execute the code to:
        transmit a request to a server to access digital content;
        pursuant to the request, receive a genuineness challenge from the server, the genuineness challenge comprises a payload and a message authentication code of the payload which are generated by the server;
        in response to receipt of the genuineness challenges, transmit a response to the server, wherein:
            the response comprises a message and a message authentication code of the message which are generated by the computing device,
            the message authentication code of the message is a function of a key of the computing device,
            the key of the computing device is not shared with the server,
            the message comprising first and second data elements of the computing device and a copy of the genuineness challenge, and
            the message authentication code of the message is obtained from the message using the key of the computing device, the server verifies that the second data element was derived from the first data element, validates the message authentication code of the message, and validates the copy of the message authentication code of the payload to provide an authorization for the computing device to access the digital content, wherein the server provides the authorization for the computing device to access the digital content without using asymmetric cryptography; and pursuant to the authorization, receives, from the server, at least one of the digital content or a key for decrypting the digital content.

11. The computing device of claim 10, wherein:
the first and second data elements and the key are unique to the computing device.

12. The computing device of claim 10, wherein:
the first and second data elements and the key are stored in fuses of the computing device.

13. The computing device of claim 10, wherein:
the second data element is an output of a first key derivation function in which the first data element of the computing device and a first secret key of the server are inputs; and
the key of the computing device is an output of a second key derivation function in which the second data element of the computing device and a second secret key of the server are inputs.

14. The computing device of claim 10, wherein:
the server provides the authorization for the computing device to access the digital content without using a database which stores unique data for the computing device.

15. A computer-readable storage device having computer-readable software embodied thereon for programming a processor at a server to perform a method for ensuring the genuineness of a client device, the method comprising:

transmitting a genuineness challenge to the client device, the genuineness challenge comprises a payload and a message authentication code of the payload which are generated by the server;

receiving a response from the client device, the response comprises a message and a message authentication code of the message which are generated by the client device, the message comprising first and second data elements of the client device and a copy of the genuineness challenge, the copy of the genuineness challenge comprising a copy of the payload and a copy of the message authentication code of the payload, and the message authentication code is obtained from the message using a non-shared key of the client device;

verifying that the second data element was derived from the first data element;

calculating the non-shared key of the client device using the first and second data elements of the client device but without using asymmetric cryptography;

responsive to the calculating, validating the message authentication code of the message;

validating the copy of the message authentication code of the payload; and responsive to the verifying that the second data element was derived from the first data element, the validating the message authentication code of the message and the validating the copy of the message authentication code of the payload, authorizing the client device to access digital content.

16. The computer-readable storage device of claim 15, wherein:
the validating the message authentication code of the message comprises using the message and the non-shared key to provide a comparison message authentication code of the message, and verifying that the comparison message authentication code of the message matches the message authentication code of the message which is generated by the client device.

17. The computer-readable storage device of claim 15, wherein:
the validating the copy of the message authentication code of the payload comprises providing a comparison message authentication code of the payload, and verifying that the comparison message authentication code of the payload matches the message authentication code which is generated by the server.

18. The computer-readable storage device of claim 15, wherein the method performed further comprises:
receiving a request from the client device to access the digital content, the transmitting of the genuineness challenge is responsive to the request.

19. The computer-readable storage device of claim 18, wherein the method performed further comprises:
in response to the authorizing, transmitting to the client device, at least one of the digital content or a key for decrypting the digital content.

* * * * *